Figure 1:
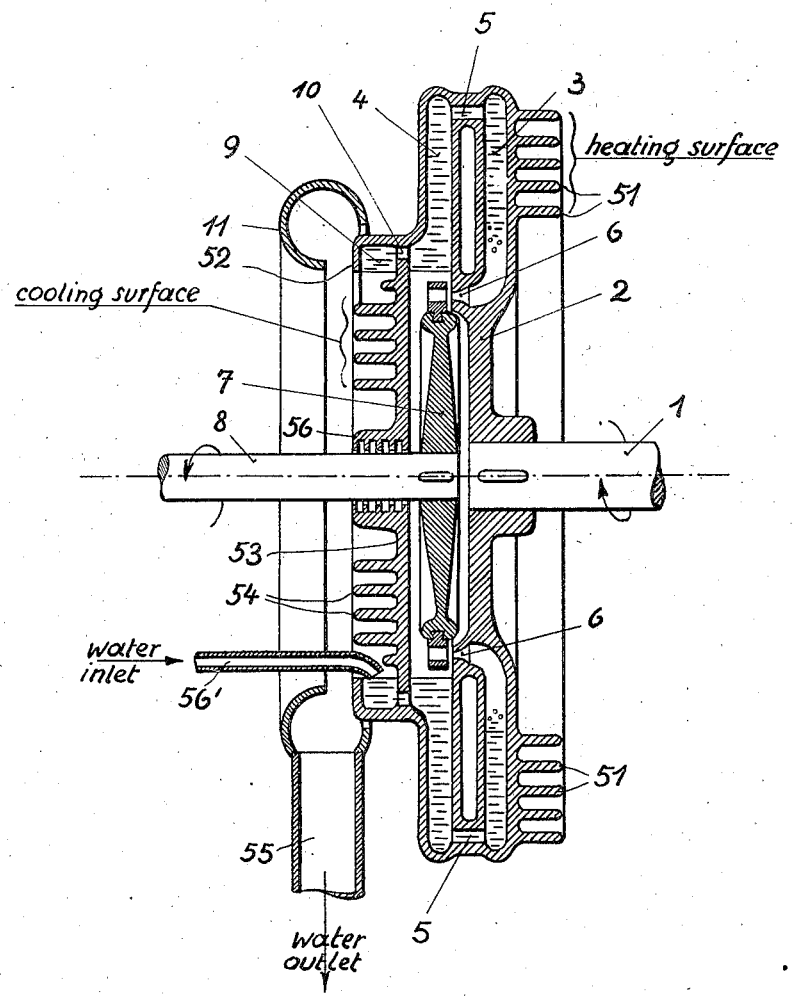

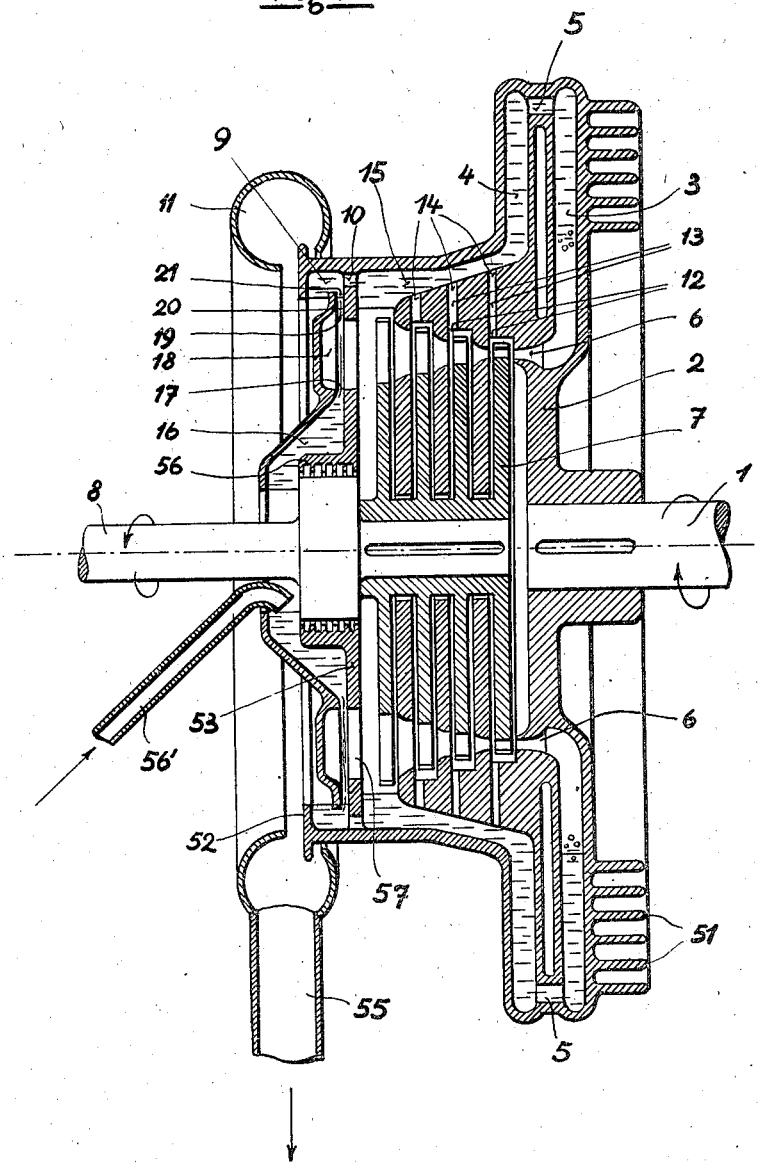

March 30, 1937.  F. HÜTTNER  2,075,648

POWER PLANT

Filed Sept. 1, 1934  4 Sheets-Sheet 3

Inventor.
Fritz Hüttner
by Lotka & Kehlenbeck
Attorneys

March 30, 1937. F. HÜTTNER 2,075,648
POWER PLANT
Filed Sept. 1, 1934 4 Sheets-Sheet 4

Inventor:
Fritz Hüttner
by
Lotka & Kehlenbeck
Attorneys.

Patented Mar. 30, 1937

2,075,648

UNITED STATES PATENT OFFICE 2,075,648

POWER PLANT

Fritz Hüttner, Karlshorst, near Berlin, Germany

Application September 1, 1934, Serial No. 742,373
In Germany February 26, 1931

13 Claims. (Cl. 60—108)

My invention relates to power plants, and more particularly to plants including a rotary steam generator.

It is an object of my invention to improve a plant of the type referred to.

To this end, I provide on the rotary steam generator a liquid container which includes two communicating chambers and is so arranged on the generator that the steam which is generated in one of the two chambers by heating the liquid, is compressed by the centrifugal action of the still unevaporated liquid in the other chamber, and the steam chamber is sealed by the liquid against the atmosphere or against any other space in which there exists a pressure different from the steam pressure in the steam chamber.

By these means, the centrifugal action of the still unevaporated liquid regulates the pressure in the steam chamber and the pressure increases with the square of the peripheral velocity.

The power developed by the generated steam may be utilized for driving the rotary generator itself, or a driven member such as a turbine impeller.

The change of condition of the heat carrier or liquid which generally is water but may be any other liquid, from evaporation to recondensation, is performed altogether within the generator, and the auxiliary machines and regulating devices required in power plants of the usual type, are dispensed with.

The comparative smallness of my novel power plant enables the plant to be used to particular advantage where the space is limited and the weight should be low, for instance, in vehicles of any kind, ships, aircrafts, etc.

In the accompanying drawings, several types of power plants embodying my invention are illustrated more or less diagrammatically by way of example.

In the drawings

Figures 3, 5:
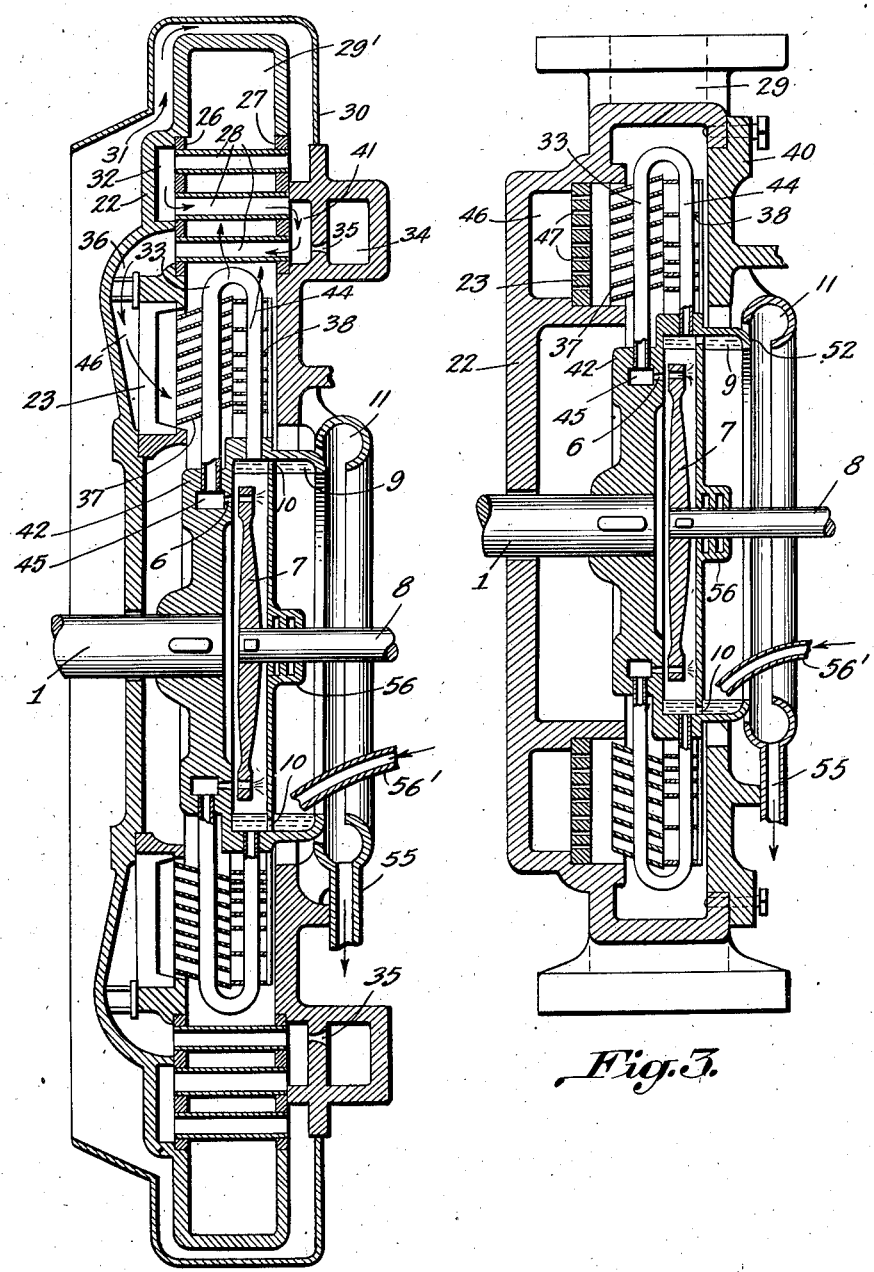
Figure 6:
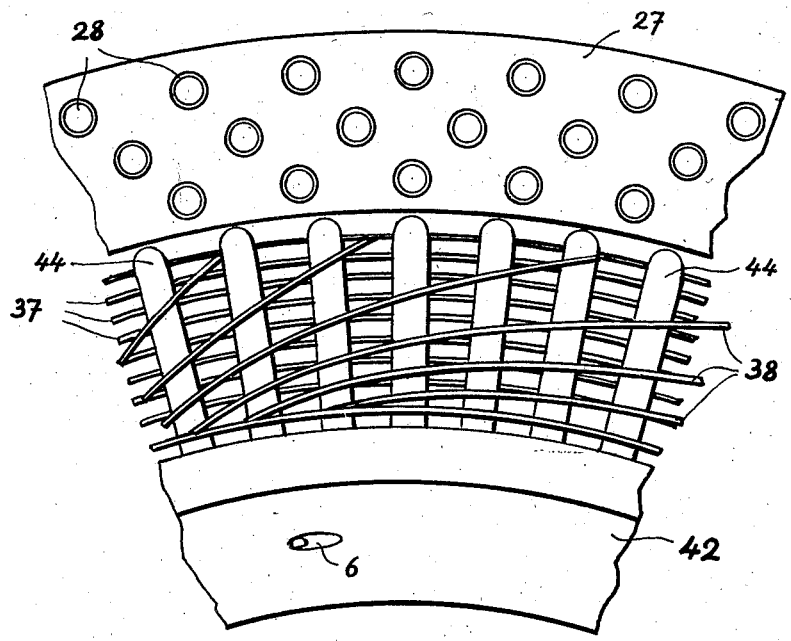
Figure 7:
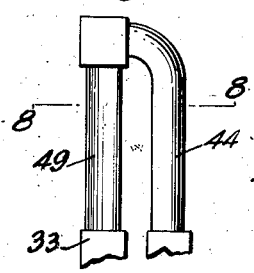
Figure 8:
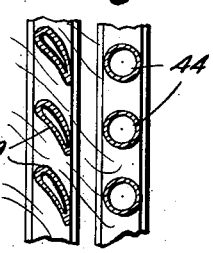
Figure 4:
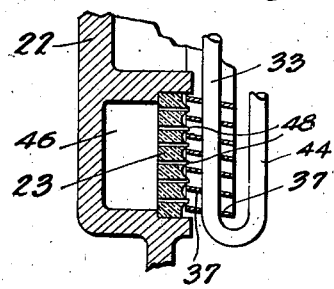

Fig. 1 is an axial section of one type of my invention whose rotary generator has a container including two communicating annular chambers and operates a single-stage turbine, Fig. 2 is an axial section of a second type whose rotary generator is similar to that of the first type but operates a multistage turbine, Fig. 3 is an axial section of a third type whose rotary generator has a container which is built up from U-shaped tubes, and a burner for heating the tubes, Fig. 4 is a detail showing a modified burner for said third type, Fig. 5 is an axial section showing part of a plant having U-shaped tubes, like the third type, and means for heating the combustion air supplied to the burner, Fig. 6 is a detail of the plant partly illustrated in Fig. 5, Fig. 7 is an elevation showing U-shaped tubes designed as vanes for rotating the generator, and Fig. 8 is a section on the line VIII—VIII in Fig. 7.

Referring now to the drawings, and first to Fig. 1, the shaft 1 on which the generator 2 is keyed, is rotated in the direction of the arrow by any suitable driving means, not shown. The generator and its parts are preferably made of metal such as cast iron, plate, etc., as used in boilers.

The container includes two annular chambers 3 and 4 which are cast integral with the generator 2. The chambers are separated by a hollow partition and communicate through openings 5 in the partition which are located near the perimeter of the generator at the outer ends of the chambers 3, 4. The chambers of the container are partly filled with liquid, generally water, and the chamber 3 has radiator ribs 51 which are heated by a suitable burner, not shown, so that steam is generated in chamber 3. At the inner end of steam chamber 3, a set of nozzles 6 or a circular ring of inclined openings, is provided. The free sectional area of the nozzles, or openings, 6 is such that the steam issuing therefrom is throttled and a certain steam pressure is maintained in steam chamber 3.

The outer wall of the liquid chamber 4 is cast integral with a cup 9 having an inwardly projecting flange 52, and with a disk 53 having radiator ribs 54. The space defined by the flange 52 of cup 9 communicates with the liquid chamber 4 through openings 10. An annular trap 11, with a drain pipe 55, surrounds the open end of the cup. 56' is a feed pipe whose outlet end opens into the cup 9.

A shaft 8 is inserted into a central boss 56 of disk 53 which may be equipped with a labyrinth packing, and a turbine impeller 7 is placed on the inner end of shaft 8, with its vanes in line with the nozzles 6.

In operation, the shaft 1 of the generator is rotated while the steam chamber 3 is heated. The steam generated in this chamber is throttled in the nozzles, and therefore pressure builds up in the steam chamber 3. Initially, the water is at the same level in both chambers under centrifugal action but the steam in chamber 3 partly expels the water from chamber 3 through openings 5 so that the water level in chamber 4 is displaced inwardly as shown until the pressure in chamber 3 is balanced by the centrifugal action of the water corresponding to the head between the two levels. The level of the water in chamber 4 is limited by the flange 52 of cup 9 which acts as an overflow. Obviously, the inside diameter of flange 52 must be larger than the outside diameter of the turbine impeller 7, as otherwise the water would interfere with the vanes of the impeller.

The steam from the nozzles or openings 6 rotates the impeller and its shaft 8 in the direction of the arrow which is opposite to the rotation of the generator shaft 1. Thus the impeller may run at high velocity, whilst the generator may rotate at a speed just sufficient to produce the desired or required steam pressure in chamber 3 and quite independent of the load of the turbine impeller. I am however not limited to opposite rotation of the generator and the impeller but the parts may rotate in the same direction but at different speeds or the impeller may be kept stationary. The openings 6 are so arranged that the generator is rotated by reaction of the issuing steam, so that the above mentioned driving means for starting the generator may be taken off.

The exhaust of the turbine impeller 7 is projected against the inner surface of the annular body of water which rotates with the generator, and condenses. The exhaust steam in the chamber 4 and in the cup 9 is cooled by heat exchange with the ambient air or by cooling water as shown in Fig. 2. The condensate makes up the volume of liquid in the container 3, 4 at the same rate that the liquid is diminished by its partial conversion into steam. The water from pipe 56' is delivered to the annular body of water in the cup 9 keeping the cup always filled at a constant level. Any excess of water is ejected into the trap 11, and drained through 55.

It will be evident that globules of water which may be present in steam, are hurled into the rotating body of liquid and therefore the known and undesired difficulties involved by the destructive action of such globules when they strike parts of the turbine are eliminated.

This will now be explained for a multistage turbine with reference to Fig. 2. The plant is substantially similar to that illustrated in Fig. 1 but its impeller 7 is of the multistage type. A liquid passage 15 is formed by the wall of the generator 2 and a boss projecting from the hollow partition between chambers 3 and 4 and supporting the distributor of the turbine. A groove 12 is formed in the boss in line with each individual impeller element, except the last one, and bores 13 extend to openings 14 in the outer face of the boss from each groove 12. The pressure of the water at the openings 14 is somewhat less than the pressure of the steam in the corresponding stage of the turbine. The steam and the water globules are thus mixed with the water, and the steam is condensed as described. At relatively light loads and correspondingly lower steam pressures, only the water globules are ejected through openings 14.

In this type, the feed pipe 56' for cooling water is arranged with its inner end quite close to the turbine shaft 8 and the boss 56 is surrounded by a cup 16 with a central opening surrounding the shaft 8 and receiving the end of the feed pipe.
The feed water is speeded up by centrifugal force and discharged at high velocity, but under no pressure, through an annular space 17 between the cup 16 and the disk 53. The water now gets into an extension 18 of the cup 16 to which the exhaust steam from turbine 7 is admitted through ports 57 in disk 53 and condensed. The mixture of air, condensate and cooling water is discharged through the annular space 19 and its velocity is transformed into pressure in a nozzle 20 whereupon the mixture is delivered to cup 9. The system is similar to the known jet condensation.

The water in cup 16 at the same time acts as a seal against the access of atmospheric air. While in Fig. 2 the cup 16 and the parts 17 to 21 and 57 associated therewith have been illustrated in connection with a multistage turbine, I do not wish to restrict myself thereto. Similarly, I do not wish to limit myself to the particular means illustrated for supplying the cooling water and for carrying away the steam, or to the specific relative arrangement of steam generator and turbine impeller.

Owing to the high speed at which the generator rotates, the heat exchange is very efficient but it may be further improved by subdividing the container into a plurality of units, as will now be described with reference to Figs. 3 and 4. Here, the generator is a rotary disk 42 in which are inserted the two ends of containers in the shape of U tubes, the shank 33 of every tube being the steam chamber and its other shank 44 being the water chamber. The cup 9, with its flange 52, to which cup water is supplied through feed pipe 56', as described, is connected to the water chambers 44 of the tubes, and their steam chambers 33 are connected to an annular steam collector 45 in the disk 42. Nozzle 6 directs the steam in collector 45 toward the vanes of impeller 7, as described. The tubes or containers 33, 44 are arranged radially on the generator, and equally spaced about its perimeter.

The generator or disk 42 rotates in a stationary casing 22 which at one side is closed by a cover 40. A burner 23, of fireclay or other suitable refractory material, with bores 47 therein, is inserted in an annular chamber 46 of casing 22. Conical or flaring concentric ribs 37 are placed about the steam chambers 33, and blades 38 whose pitch increases toward the perimeter, are placed about the water chambers 44, as best seen in Fig. 6. The blades 38 are curved to spiral shape. The conical or flaring ribs 37 increase the heating surface of the chambers 33 but their principal function is to prevent short-circuiting of the heating gases from burner 23 into the discharge pipe 29 of casing 22. The spiral blades 38 act to draw the gases from out of the spaces between the ribs 37 and to conduct them to the pipe 29. At the same time, the water in the water chambers 44 is heated by the gases.

Combustible mixture is supplied to the burner 23 by any suitable means, not shown. The plant has the advantage that it automatically regulates its own fuel supply, as more intense suction is exerted on the fuel mixture by the blades 37 and 38 as the speed increases.

The efficiency of burner 23 is increased by providing it with nozzles 48, as shown in Fig. 4, in line with the spaces between the conical or flaring ribs 37.

Means for heating the air for combustion supplied to the burner 23 will now be described with reference to Figs. 5 and 6. The casing 22 is surrounded by a cowl 30 of sheet metal in spaced relation. Combustion air is admitted to the cowl at 31. A pair of rings 26 and 27 are inserted in the casing 22 and connected by tubular stays 28. Under the suction which the blades 38 exert on the burner 23, as described, the air from 31, 30 flows as follows: Outer row of stays 28, chamber 32 in casing 22, central row, chamber 41, inner row, chamber 36 to which the chamber 46 of burner 23 is connected. A supply of gaseous fuel is present in a chamber 34 at the side of chamber 41, and is drawn into chamber 41 through an opening, or openings, 35. The openings are preferably aligned with the stays 28 of the inner row. The fuel is mixed with the air for combustion and the mixture delivered to the burner 23, as described. The heating gases, after giving up part of their heat to the containers 33, 44, flow about the stays 28 and through the exhaust chamber 29' of the casing 22 in heat-exchanging relation to the air in cowl 30 and in stays 28 until they are discharged through pipe 29, Fig. 3.

It is understood that other means than those described, and, in fact, most of the known air heaters, might be used for my generator. However, the waste heat is utilized much more efficiently by the annular system of stays 28 surrounding the generator and the impeller. The impeller has been omitted from Fig. 5 but it is understood that it will be arranged as shown in Fig. 3. In the annular system, the radial flow of the gases is considered and the heater is placed where the temperature of the gases is still comparatively high. As to structure, the annular system has the advantage that it fits well with the other concentric parts, i. e., the generator, the annular burner 23, the condenser, and other parts. The heat exchange is based on the counterflow principle, as the air flows inwardly and the gases flow outwardly. By these means, the combustion air first enters into heat-exchanging relation with that portion of the gases which has already delivered the major portion of its heat.

The rings 26 and 27 and the stays 28 are a self-contained unit which is readily inserted and as readily removed for inspection or repair.

The subdivision of the air heater into a large number of small units, i. e., the stays 28, is particularly favorable for operation with a mixture of liquid fuel and air, because backfiring involves only a small volume of the mixture, and therefore is harmless.

As has been stated above, either gaseous or liquid fuel may be employed in my improved power plant.

If the fuel is ignited under pressure, means may be provided for rotating the generator 2 through the kinetic energy of the heating gases. As shown in Figs. 7 and 8, the steam chambers 33 are formed as tubular blades 49 or combined with vanes. The heating gases pass in contact with the outer surfaces of the liquid chambers 33, 44 and act on the blades, heating the liquid therein and driving the generator. While I have shown vane portions or tubular blades such as 49 only on the steam chambers 33, I do not wish to restrict myself to this embodiment.

If the impeller of the turbine rotates in opposite direction to the generator, as shown in Figs. 1 and 2, both the impeller and the generator may develop power. Obviously, the impeller might be kept stationary and only the generator might rotate. While the part driven by the steam has been shown as a turbine, I do not wish to restrict myself to this form of steam engine.

I claim:

1. A rotary vapor generator comprising a vapor generating member in which the vapor and any unvaporized liquid are caused to flow toward the axis of rotation of said generator, a liquid supply member in which the vaporizable liquid is caused to flow outwardly with respect to such axis, said members communicating with each other at their outer portions so that the liquid may pass from said supply member to said vapor generating member, means for delivering to said liquid supply member any liquid carried by the vapor generated in said vapor generating member, and means for withdrawing the generated vapor from said vapor generating member and confining said vapor so that the heat energy thereof may be utilized.

2. A rotary vapor generator comprising a vapor generating member in which the vapor and any unvaporized liquid are caused to flow toward the axis of rotation of said generator, a liquid supply member in which the vaporizable liquid is caused to flow outwardly with respect to such axis, said members communicating with each other at their outer portions so that the liquid may pass from said supply member to said vapor generating member, said liquid supply member having an inlet opening thereinto for receiving liquid to be vaporized, means for delivering to said liquid supply member any liquid carried by the vapor generated in said vapor generating member, means providing a liquid seal located at the inlet of said supply member, and means for withdrawing the generated vapor from said vapor generating member and confining said vapor so that the heat energy thereof may be utilized.

3. A power plant comprising a rotary structure including a liquid supply member having an inlet opening thereinto for receiving liquid to be vaporized and also having an outlet, the outlet being farther away from the axis of rotation of said structure than said inlet, a vapor generating member having an inlet and an outlet, the outlet being nearer said axis of rotation than the inlet of said vapor generating member, the inlet of said vapor generating member communicating with the outlet of said liquid supply member, an impeller chamber the inlet of which is connected to the outlet of said vapor generating member, an impeller in said chamber, the exhaust side of said chamber being connected with the said liquid supply member, and means for forming a liquid seal at the inlet of said liquid supply member to prevent the exhaust vapor from blowing out through the liquid at said inlet.

4. A power plant comprising a rotary structure including a liquid supply member having an inlet opening thereinto for receiving liquid to be vaporized and also having an outlet, the outlet being farther away from the axis of rotation of said structure than said inlet, a vapor-generating member having an inlet and an outlet, the outlet being nearer said axis of rotation than the inlet of such vapor-generating member, the inlet of said vapor-generating member communicating with the outlet of said liquid supply member, an impeller chamber the inlet of which is connected to the outlet of said vapor-generating member, an impeller in said chamber, the exhaust side of said chamber being connected with the said liquid supply member, means for forming a liquid seal at the inlet of said liquid supply member to prevent the exhaust vapor from blowing out through the liquid at said inlet, and means for conveying a stream of liquid to the inlet of said liquid supply member.

5. A power plant comprising a vapor generating element of the type in which vapor is generated from the liquid flowing therein, means for revolving said element as a whole about an axis, the arrangement of said element with respect to said axis being such that under the action of centrifugal force the liquid contained in a part of said element is caused to flow in the direction outwardly from said axis, means for so heating said element as to generate vapor therein while substantially preventing such generation in said part of the element in which said liquid flows outwardly of the axis as would interfere with said flow, means for discharging the generated vapor from said element at a point located inwardly of the point at which said outward flow in said element is initiated, an impeller having a plurality of spaced members arranged to receive successively the vapor discharged from said element, and vapor-directing members held to rotate with said vapor-generating element and arranged in alternation with said spaced impeller members, said element being provided with a plurality of ducts extending outwardly from points adjacent to the several impeller members to a portion of said element in which there is a flow of liquid, whereby globules of liquid contained in the vapor will be conducted away from such vapor and conveyed to the said liquid.

6. A steam generator comprising a steam generating element of the type in which steam is generated from the water flowing therein, means for revolving said element as a whole about an axis, the arrangement of said element with respect to said axis being such that the water contained in a part thereof under the action of the centrifugal force of the revolution is caused to flow in the direction outwardly from said axis, means for so heating said element as to generate steam therein while substantially preventing in said part thereof in which said water flows outwardly of the axis generation of steam such as would interfere with said outward flow, means for discharging the generated steam from said element at a point located inwardly of the point at which said outward flow in said element is initiated, means for conducting to said part of the element under the action of the centrifugal force any liquid carried by the steam, and means for confining said discharged steam so that the heat energy thereof may be utilized.

7. A steam generator comprising a steam generating element of the type in which steam is generated from the water flowing therein, means for revolving said element as a whole about an axis, the arrangement of said element with respect to said axis being such that the water contained in a part thereof under the action of the centrifugal force of the revolution is caused to flow in the direction outwardly from said axis, means for so heating said element as to generate steam therein while substantially preventing in said part thereof in which said water flows outwardly of the axis generation of steam such as would interfere with said outward flow, means for discharging the steam generated in said element to said part thereof at a point located inwardly of the point at which said outward flow is initiated, and means for confining said discharged steam so that the heat energy thereof may be utilized.

8. A vapor generator comprising a structure rotatable upon an axis, said structure being so constructed as to provide two passages extending generally in the direction outwardly of said axis of rotation, said passages being connected together at two places positioned one inwardly with respect to the other in relation to said axis, one of said passages being provided with a liquid inlet opening thereinto for receiving liquid to be evaporated, and means for so applying vapor generating heat to said structure as to cause the liquid to flow in the one passage outwardly from said opening and vapor to flow inwardly toward said axis in the other passage, said rotatable structure providing means for withdrawing the generated vapor from said other passage through said inwardly positioned connection and confining it so that the heat energy thereof may be utilized.

9. A vapor generator comprising a structure rotatable upon an axis, said structure being so constructed as to provide two passages extending generally in the direction outwardly of said axis of rotation, said passages being connected together at two places positioned one inwardly with respect to the other in relation to said axis, one of said passages being provided with a liquid inlet opening thereinto for receiving liquid to be evaporated, means for so applying vapor generating heat to said structure as to cause the vapor to be discharged from the other passage through said inward connection, means for maintaining said liquid inlet opening sealed against escape of the vapor by the liquid to be evaporated and delivered to said opening, and means for confining said discharged vapor so that the heat energy thereof may be utilized.

10. A vapor generator comprising a structure rotatable upon an axis, said structure being so constructed as to provide two passages extending generally in the direction outwardly of said axis of rotation, said passages being connected together at two places positioned one inwardly with respect to the other in relation to said axis, one of said passages being provided with a liquid inlet opening thereinto for receiving liquid to be evaporated, means for heating the other passage to generate vapor while preventing substantial generation of vapor in said passage provided with said inlet opening, and means for maintaining said liquid inlet opening sealed against escape of the vapor by the liquid to be evaporated and delivered to said opening, said passage provided with said inlet opening being so formed in said rotatable structure with respect to said inwardly positioned connection that liquid carried by the vapor passing through said inwardly positioned connection under the action of centrifugal force is thrown into said passage having the inlet opening to mix with the liquid therein, said rotatable structure being so formed as to provide for withdrawing the generated vapor from said other passage through said inwardly positioned connection and confining it so that the heat energy thereof may be utilized.

11. A vapor generator comprising a structure rotatable upon an axis, said structure being so constructed as to provide two passages for confining liquid to be evaporated extending generally in the direction outwardly of said axis of rotation, said passages being connected together at two places positioned one inwardly with respect to the other in relation to said axis, means for heating one of said passages to generate vapor therein while preventing substantial generation of vapor in the other passage to cause the generated vapor to flow in said first passage toward said axis and into said inwardly positioned connection, said other passage being so formed with respect to said inwardly positioned connection that liquid carried by the vapor passing through said inwardly positioned connection under the action of centrifugal force is thrown into said other passage to mix with the liquid therein, said inwardly positioned connection being so constructed as to provide a throttling device through which the vapor discharged from said first passage may expand, and means for confining the expanded vapor so that the heat energy thereof may be utilized.

12. A steam generator comprising a plurality of tubular steam generating elements constructed and arranged as a structure rotatable upon an axis and with at least a part of their lengths extending outwardly of said axis, said elements being arranged in spaced relation about said axis, a casing extending about said structure to confine the heating gases, said casing having an outlet opening in peripheral relation to said rotating structure, and blades mounted on said elements and extending away from said axis toward the outlet of said casing and formed to cause the heating gases to flow along said elements outwardly toward said outlet.

13. A steam generator comprising a plurality of tubular steam generating elements constructed and arranged as a structure rotatable upon an axis and with at least a part of their lengths extending outwardly of said axis, said elements being arranged in spaced relation about said axis, a casing extending about said structure to confine the heating gases, said casing having an outlet opening in peripheral relation to said rotatable structure, blades mounted on said elements and extending away from the said axis toward the outlet of said casing and formed to cause the heating gases to flow along said elements outwardly toward said outlet, and air preheater elements mounted in said casing and arranged in the path of the gases propelled by said rotatable structure.

FRITZ HÜTTNER.